United States Patent
Noblet et al.

[11] Patent Number: 6,142,865
[45] Date of Patent: Nov. 7, 2000

[54] LONG LIFE VEHICLE VENTILATION SYSTEM

[75] Inventors: C. Dale Noblet, San Bernardino, Calif.; Stephen R. Packer, Las Vegas, Nev.

[73] Assignee: Can-Am Marketing Corp., Las Vegas, Nev.

[21] Appl. No.: 09/178,878

[22] Filed: Oct. 26, 1998

[51] Int. Cl.[7] .................................................. B60H 1/26
[52] U.S. Cl. ......................... 454/151; 454/137; 454/143
[58] Field of Search .................................. 454/112, 119, 454/128, 139, 137, 143, 151, 152, 155

[56] References Cited

U.S. PATENT DOCUMENTS

| | | |
|---|---|---|
| 2,470,799 | 5/1949 | Ames . |
| 2,495,537 | 1/1950 | Mousel ............................. 261/92 |
| 2,529,994 | 11/1950 | Brezek ............................. 180/54 |
| 2,556,464 | 6/1951 | Brezek ............................. 180/54 |
| 2,557,908 | 6/1951 | Cross . |
| 2,576,503 | 11/1951 | Dean ............................. 261/92 |
| 2,731,098 | 1/1956 | Saives ............................. 180/54 |
| 2,779,164 | 1/1957 | Doane ............................. 62/6 |
| 2,787,206 | 4/1957 | Dustman . |
| 3,211,076 | 10/1965 | Chancellor et al. ............... 454/119 X |
| 3,329,077 | 7/1967 | Grosso ............................. 454/137 |
| 4,072,487 | 2/1978 | Irwin ............................. 62/244 |
| 4,350,084 | 9/1982 | Azzola . |
| 5,308,279 | 5/1994 | Grinberg ............................. 454/151 X |
| 5,370,576 | 12/1994 | Krofchalk ............................. 454/143 |
| 5,399,121 | 3/1995 | Gray et al. ............................. 454/137 |
| 5,472,378 | 12/1995 | Skoff ............................. 454/141 |
| 5,833,528 | 11/1998 | Baum et al. ............................. 454/151 |

FOREIGN PATENT DOCUMENTS

| 1066846 | 1/1984 | U.S.S.R. ............................. 454/137 |
|---|---|---|

*Primary Examiner*—Harold Joyce
*Attorney, Agent, or Firm*—Cislo & Thomas LLP

[57] ABSTRACT

A ventilation system for a long life vehicle (LLV). A rear vent currently existing on most LLV's is secured by an adapter to provide air to a squirrel cage fan or other air pump. The cooler air is ducted to the forward passenger compartment where its glass enclosure serves to heat the confines to high temperatures during sunny days. A resistor in the ductwork serves as a generally electrically-identical configuration to an auxiliary fan currently present in most LLV's. The ductwork transmits the air pumped from the rear vent to a vent assembly having a plenum and louvers with grills. The plenum provides a small and temporary reservoir for the air flow so that it may be redirected sideways to the louvers. The louvers provide course adjustment for the airflow with finer adjustment achieved through the grills. Overall advantages include greater driver and passenger well being leading to safer operation of the vehicle as well as less thermal stress for the instruments and operating controls. The cost and expense of air conditioning including installation, maintenance, and fuel may be greatly reduced.

21 Claims, 11 Drawing Sheets

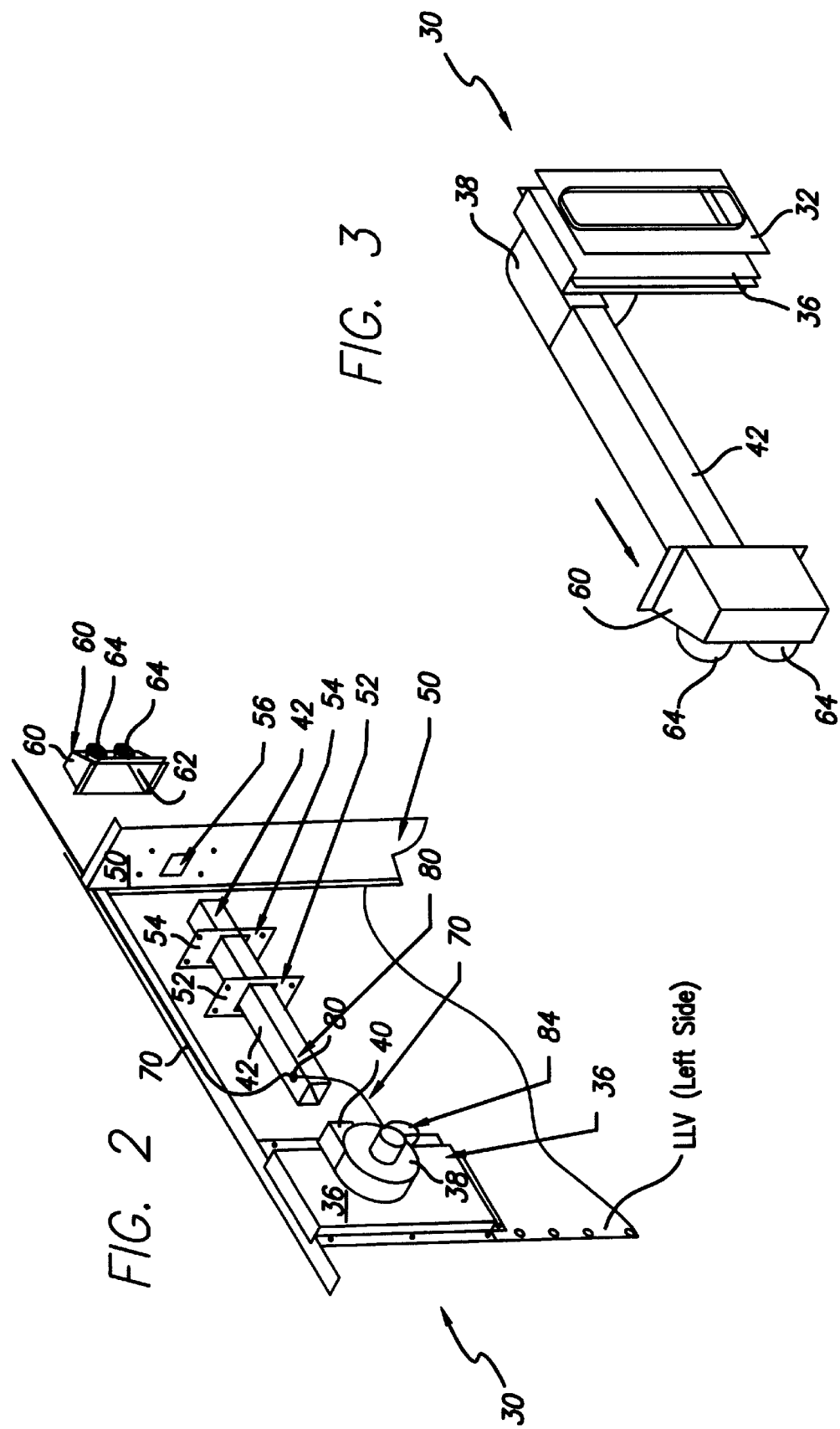

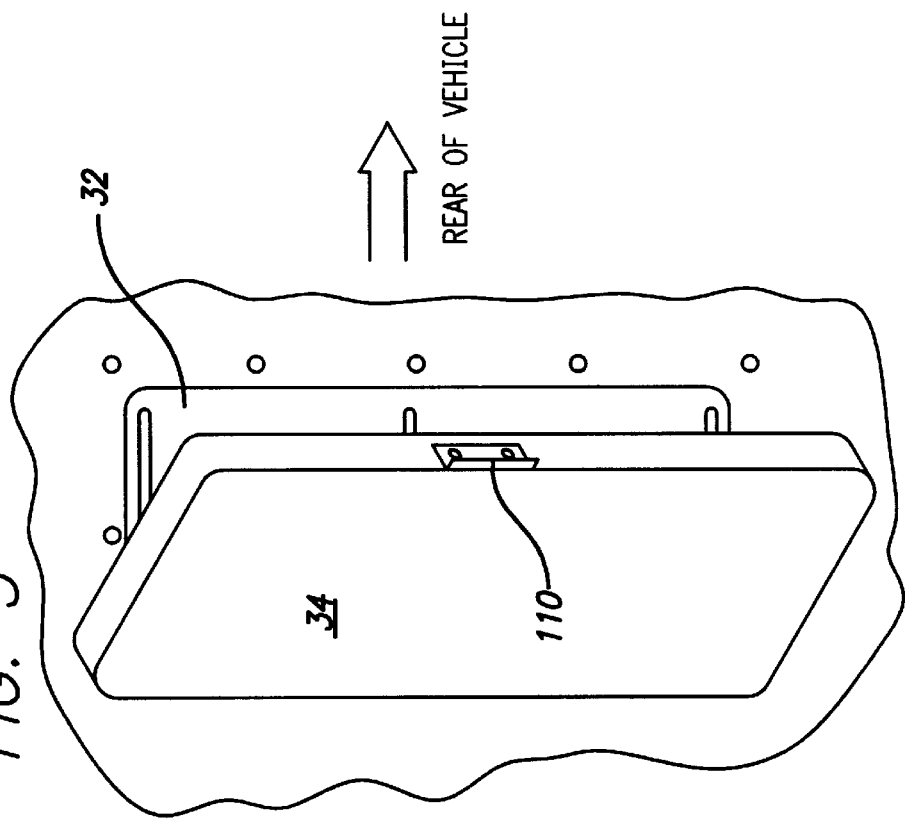
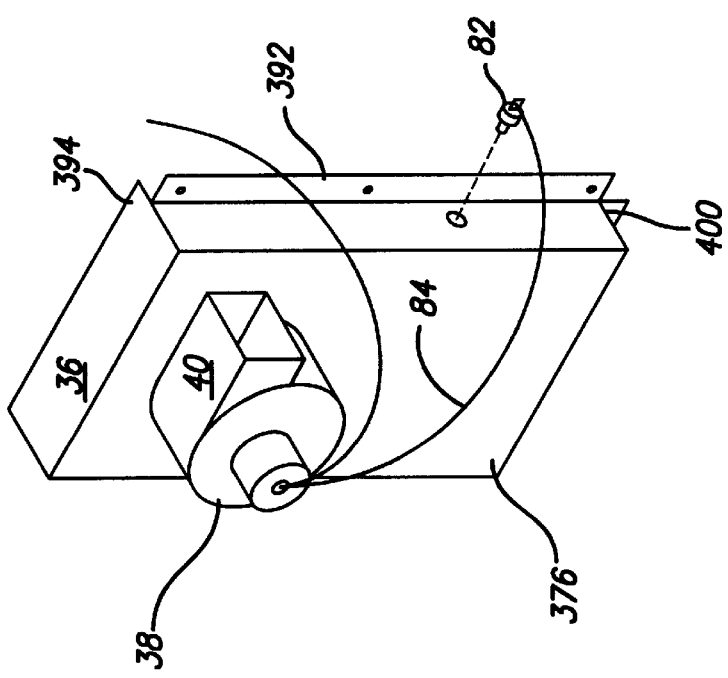

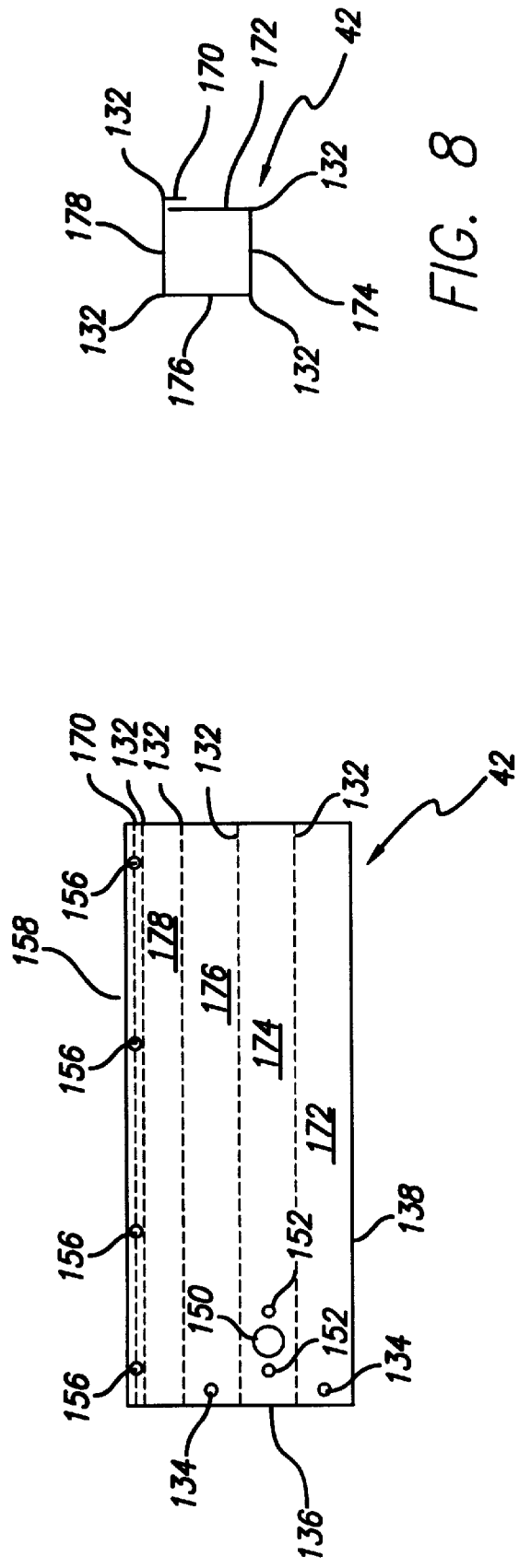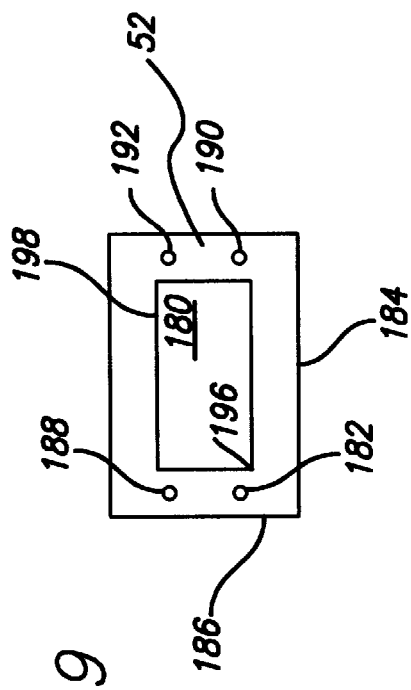

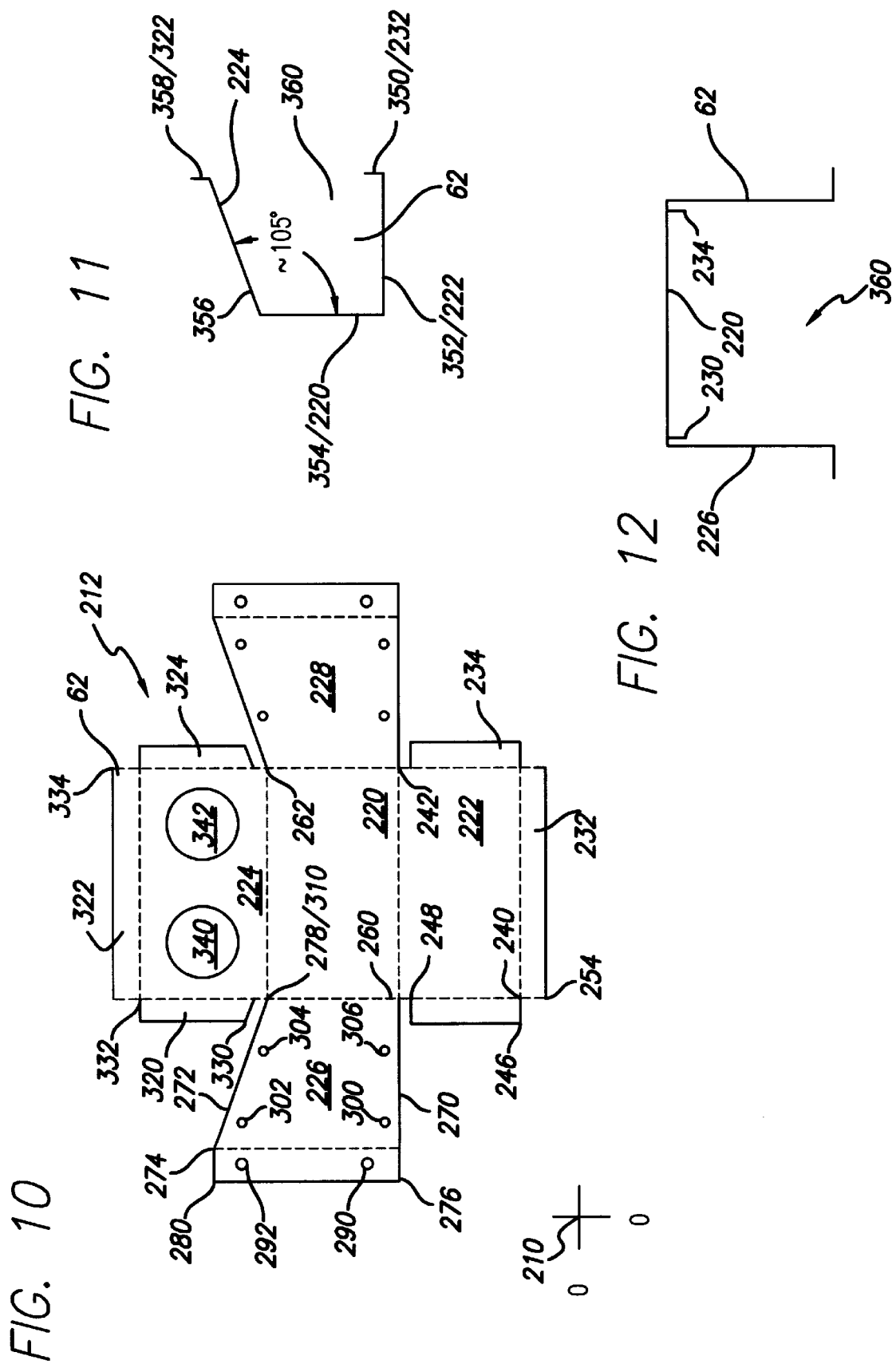

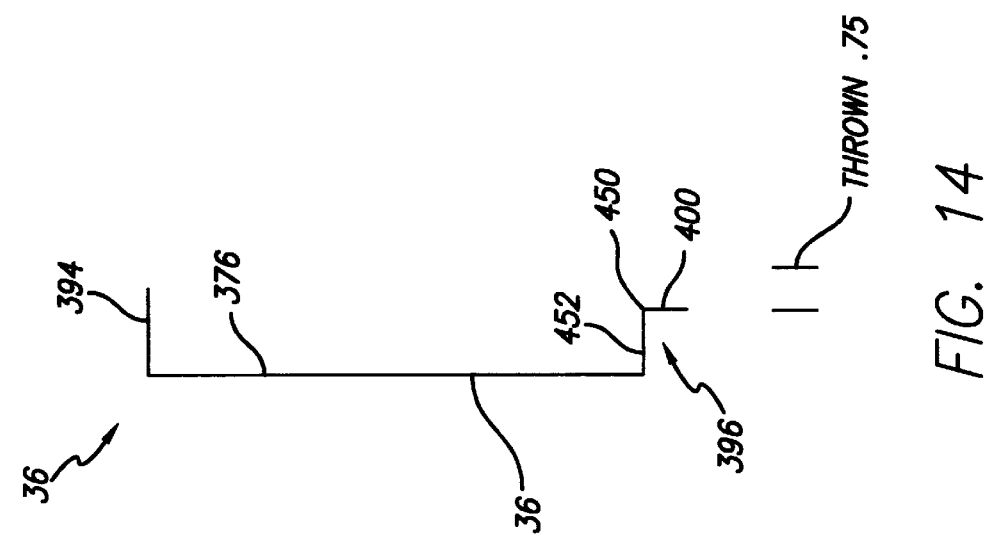
FIG. 14
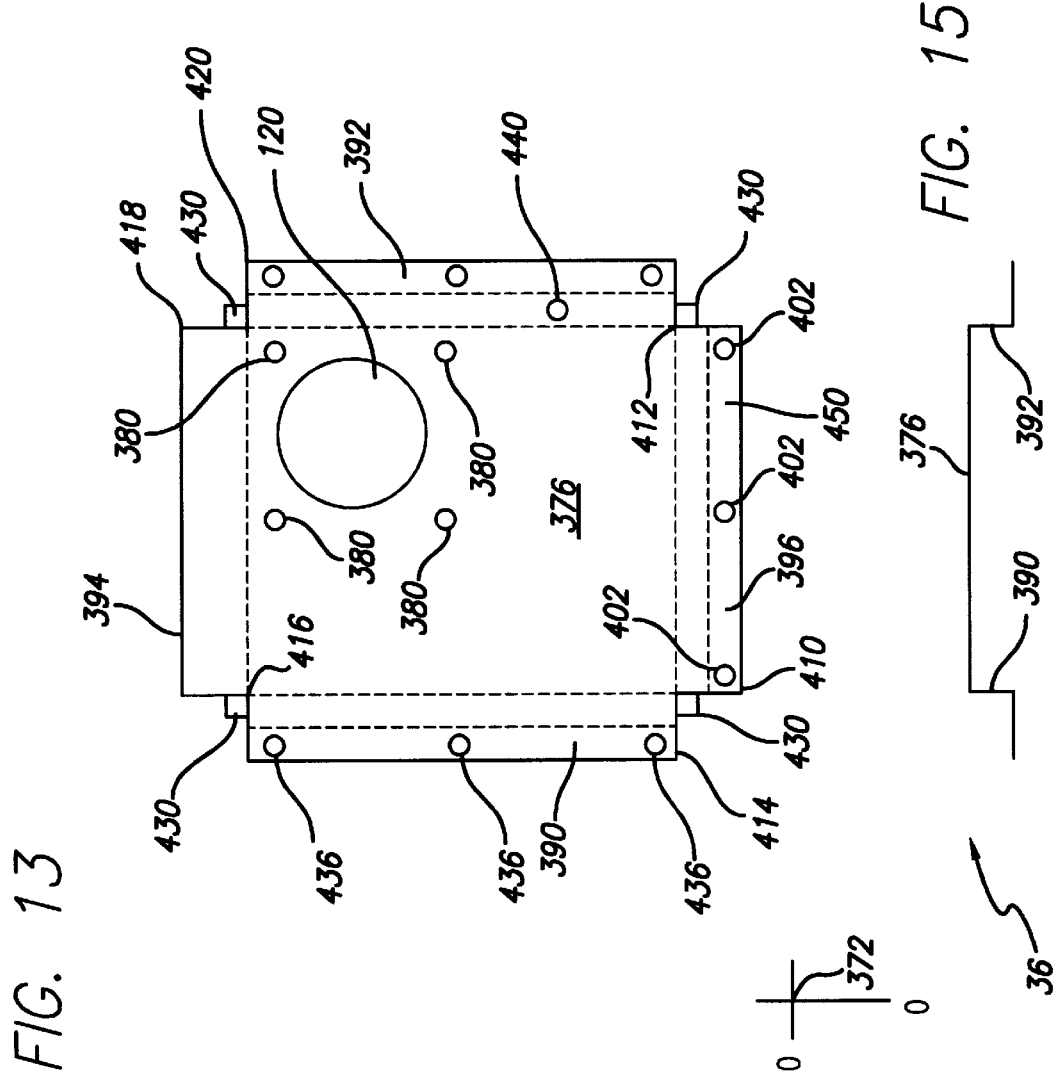
FIG. 13
FIG. 15

FIG. 16
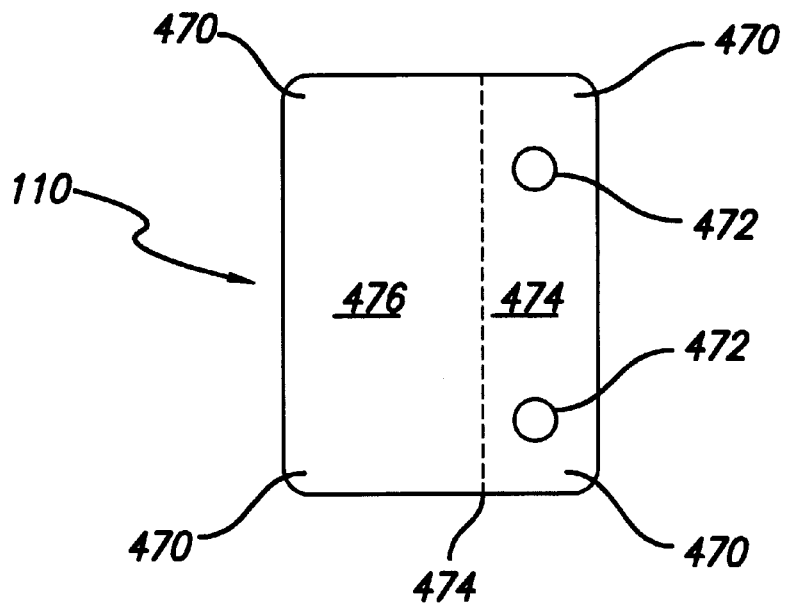
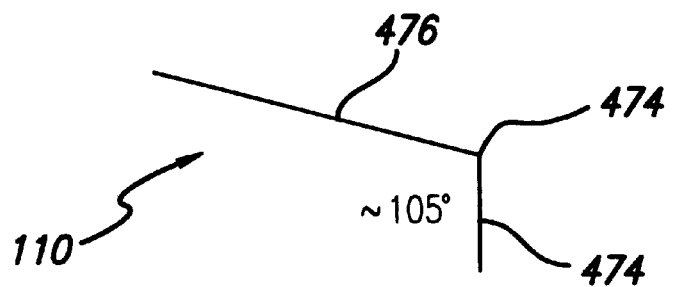
FIG. 17

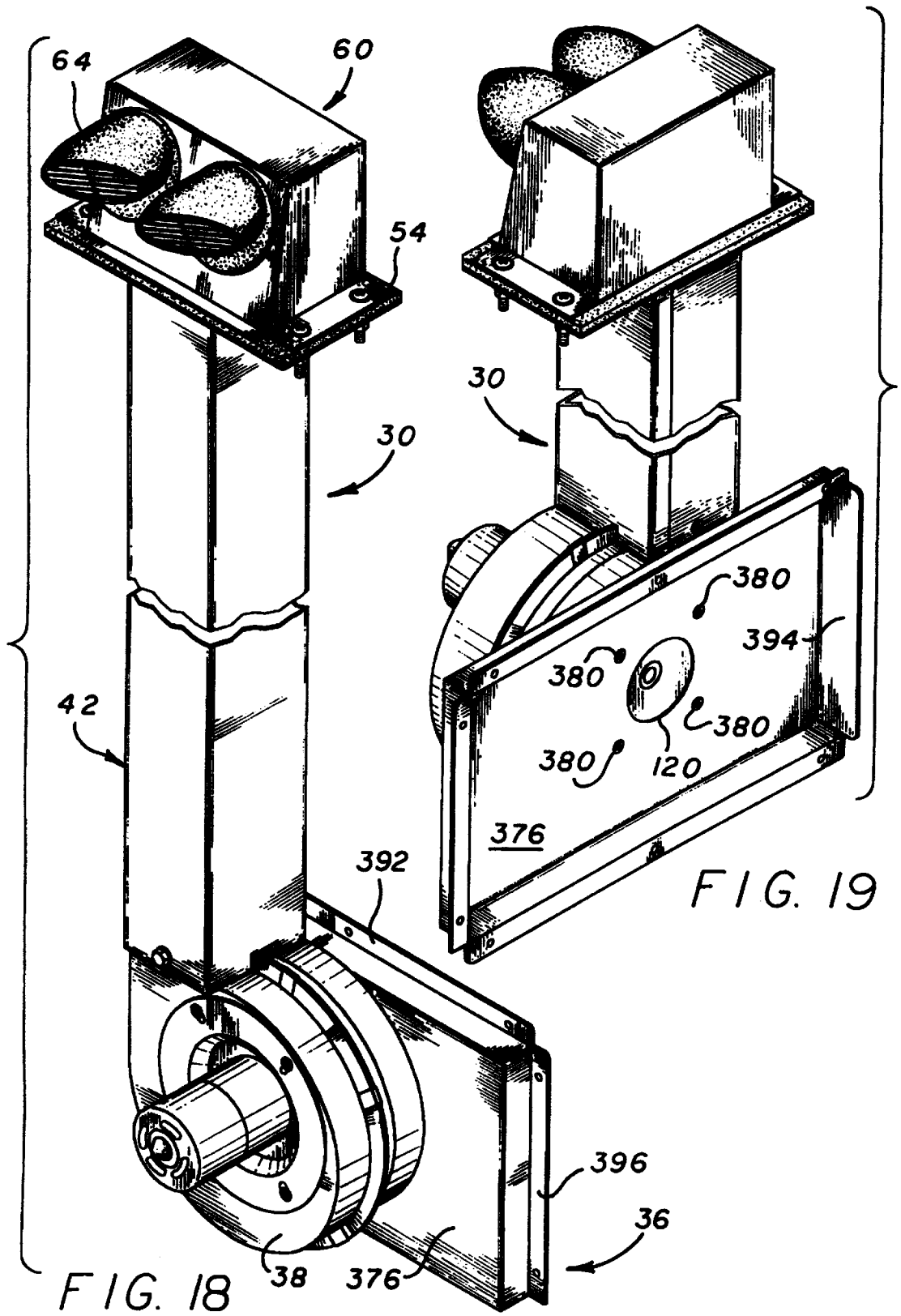

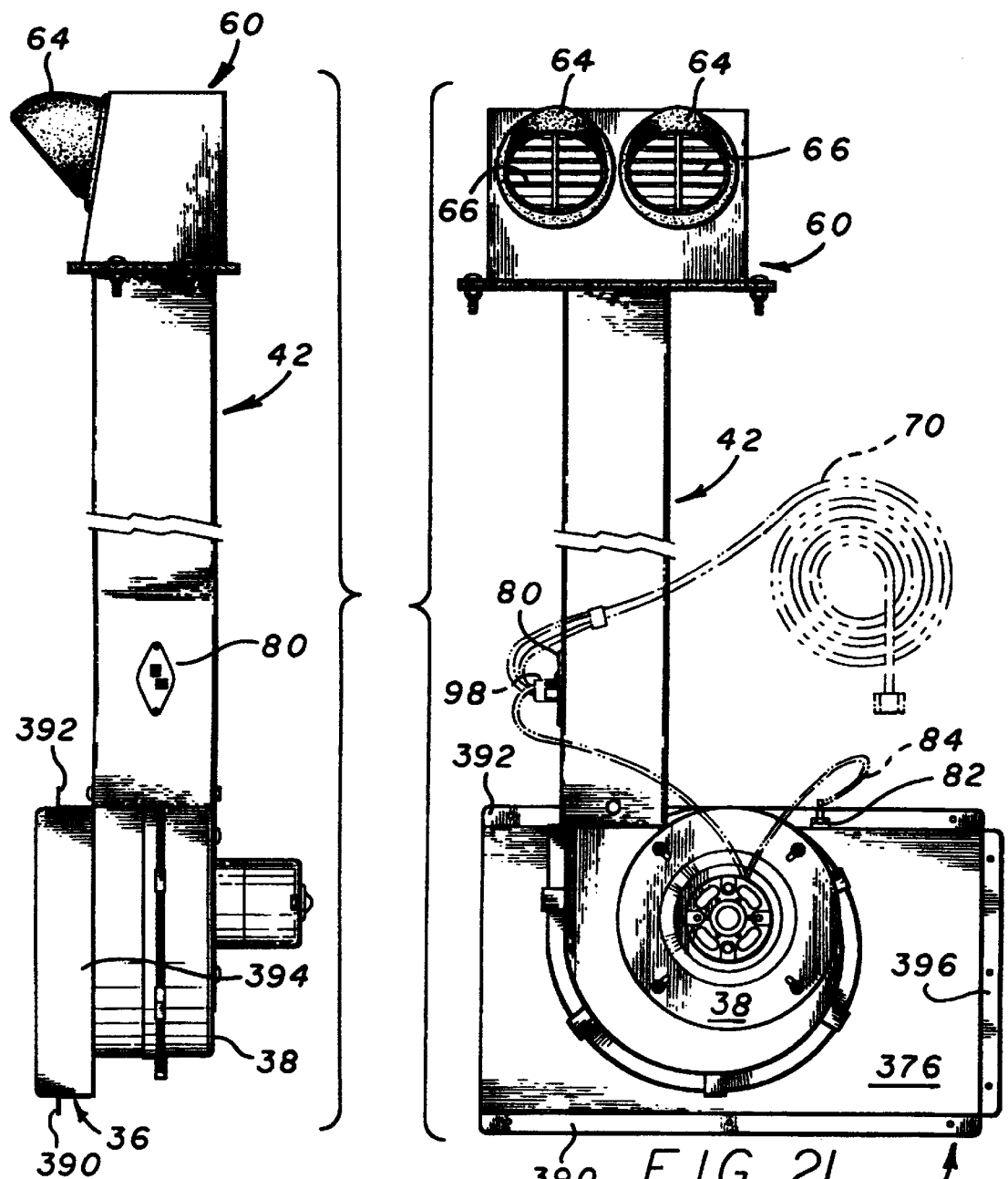
FIG. 20
FIG. 21
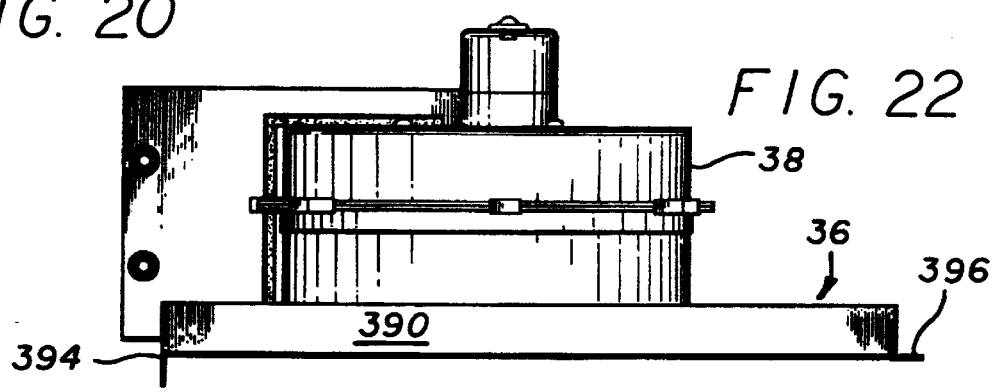
FIG. 22

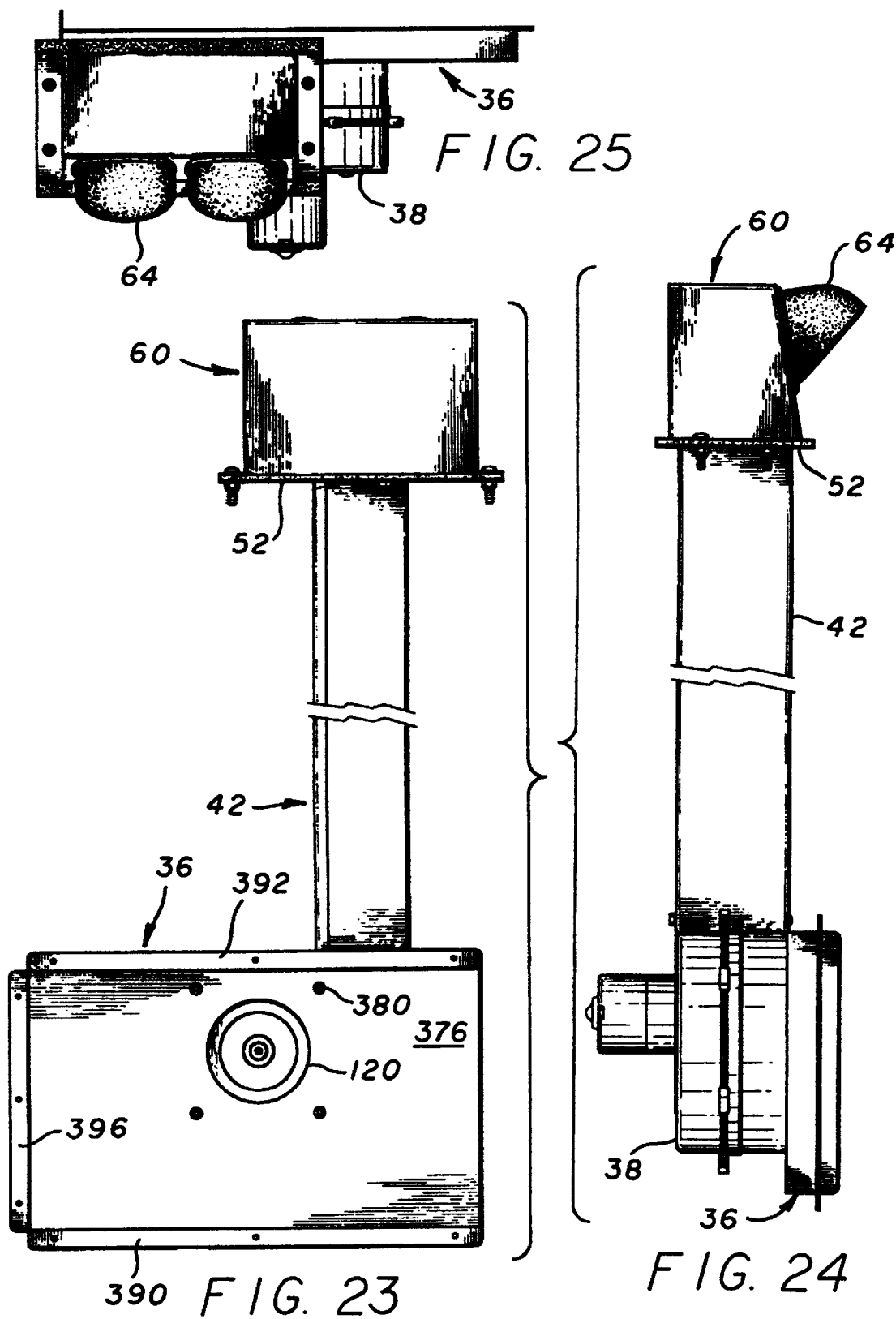

LONG LIFE VEHICLE VENTILATION SYSTEM

CROSS-REFERENCE TO RELATED APPLICATIONS

This patent application is related to U.S. provisional patent application No. 60/092,700 filed on Jul. 14, 1998 for a Long Life Vehicle Ventilation System, which is incorporated herein by this reference thereto.

BACKGROUND OF THE INVENTION

1. Field of the Invention

This invention relates to ventilation systems for vehicles, and more particularly to a counterflow ventilation system for a long life vehicle such as a mail or parcel cargo distribution vehicle.

2. Description of the Related Art

Most vehicle ventilation systems arise from fans used in quarters adjacent the hot engine block or engine compartment. Consequently, such ventilation systems pull in hot air adjacent the engine compartment and transmit it to the confines of the interior of the nearby passenger compartment. While air conditioning and the like may be used to cool such air, the drawing of such air from adjacent the engine compartment leads to preheating of such air before it may be cooled by air conditioning or the like. When such air is merely vented into the interior of the passenger compartment, the heat absorbed by the air heats the passenger compartment.

While air conditioning may be used to cool such air, some vehicles do not have air conditioning or otherwise the air conditioning is disabled. This latter problem may be particularly true with U.S. mail and other residential and commercial parcel and package carriers as the air conditioning systems are sometimes disabled in such vehicles. Additionally, such vehicles by necessity may heat up due to the greenhouse effect and the locked confines of the glass-enclosed passenger compartment. In fact, such vehicles may have extensive glass panels surrounding the passenger/driver compartment in order to provide maximum visibility. Consequently, greenhouse-type heating can become a significant impediment to use.

In long life vehicles such as those used by the United States Postal Service, a cargo area is partitioned off by panels and a door from a passenger, or driver's, compartment. The cargo compartment has few windows, but does have two vents located on either side of the vehicle. The vent on the right side of the vehicle is generally above the exhaust. When the vehicle is idling or otherwise running, but not moving, exhaust fumes may be present adjacent this rear vent. On the left side of the vehicle, a similar vent is present. Generally, there is no exhaust on the left side of such a long life vehicle and the air adjacent this rear vent is relatively free from exhaust fumes.

Covers are present for both the right and left rear vents present in the upper corners of the cargo compartment of such long life vehicles. These vents may be articulated to scoop air inwards by flaring outward in a forward-facing manner. However, such positioning of the covers allows rain to enter into the vents or to be directed towards them. Under such conditions, the covers can be articulated so that they flare outward, facing rearwardly, such that the forward motion of the long life vehicle forces the rain to hit the cover, leaving the rear vents generally free from the surrounding precipitation.

The passenger compartments of such long life vehicles are enclosed on three sides by extensive glass panels. Sliding doors on left and right sides have upper glass partitions which may slide down into the lower portion of the doors. These doors and their windows must be closed and locked completely when the mail carrier temporarily leaves the vehicle in order to deliver mail. The locked condition of the long life vehicle protects the undelivered mail held in the cargo compartment. The front windshield of the long life vehicle is transparent and spans the width of the vehicle. The driver's seat for such a long life vehicle is on the right hand side, generally opposite the left hand side driver's seat present in American automobiles.

It is to be expected when the long life vehicle is left in a closed and locked condition while the mail carrier is executing mail delivery duties or the like, that the sun shines in through the glass windows of the vehicle and, by the greenhouse effect, serves to heat up the confines of the long life vehicle. In some areas of the southwest, the interior temperature of such long life vehicles can rise as high as 170° F. Such high temperatures apply thermal stress not only to the contents of the long life vehicle while it is closed, but also upon the driver and any other occupants of the vehicle while it is in motion.

Using the ventilating blower or auxiliary fan originally included with many such long life vehicles only serves to circulate hot air that has been preheated by the proximity (in the case of the blower) to the hot engine compartment and by hot conditions created in the closed and locked van. However, upon traveling a short distance, the cargo compartment of the long life vehicle has a tendency to cool down rather quickly due to the presence of the vents. The forced air flow arising when the covers face forwardly serve to inject air into the cargo compartment.

It would therefore be a significant improvement in the art to provide the fresh air available to the cargo compartment to the driver's compartment where the individuals executing their duties could be subject to less heat and thermal stress.

SUMMARY OF THE INVENTION

The present invention provides a counterflow system that ventilates the passenger/driver compartment of a long life vehicle (LLV). Instead of using engine-preheated air from an installed blower or recirculating air already warmed in the interior of the passenger/driver compartment.

In the present invention, an adaptor fits over the interior inlet of a rear vent. The left rear vent is preferred as it its located away from the exhaust of the LLV. The adaptor restricts air flow from the rear vent and guides such air exclusively to a squirrel-cage fan through an aperture in the adaptor. The aperture is disposed generally opposite the rear vent. The squirrel-cage fan pumps the air to a duct to transmit the fresh cool, air to the passenger/driver compartment.

A vent assembly receives the ducted air pumped by the fan. The vent assembly has a plenum that temporarily pools the air. Grilled louvers allow the pooled air to pass from the plenum to the passenger/driver compartment. The fresh, cool air from the rear vent ventilates and displaces the hot, stale air of the passenger/driver compartment.

The louvers and grills allow adjustment of the outflowing air from the vent assembly, allowing selective redirection thereof. In addition to providing a novel counterflow system (that is, one that flows toward the engine of the vehicle with cool outside air rather than one that flows from the engine with warm, preheated air), the LLV ventilation system of the present invention is generally easy to construct and install at a reasonable price. Among the advantages realized by the present invention are less driver stress, less thermal stress on the vehicle's operating instruments, and saved expenses from the lack of otherwise-required air conditioning.

OBJECTS OF THE INVENTION

It is an object of the present invention to provide a long life vehicle ventilation system that ventilates the passenger compartment of a long life vehicle.

It is another object of the present invention to provide a long life vehicle ventilation system that capitalizes upon the fresh and generally cooler air available to the cargo compartment by transmitting it to the passenger compartment.

It is yet another object of the present invention to provide a long life vehicle ventilation system that forces cooler ambient air into the passenger compartment at any vehicle velocity.

It is an additional object of the present invention to provide a long life vehicle ventilation system that avoids preheating of ventilation air by an adjacent engine compartment.

These and other objects and advantages of the present invention will be apparent from a review of the following specification and accompanying drawings.

BRIEF DESCRIPTION OF THE DRAWINGS

FIG. 2 is a right rear perspective and partially exploded view of the long life vehicle ventilation system of the present invention partially showing the wiring, duct work, and gasketing present to transmit the cooler rear vent air to the hot passenger compartment.

FIG. 3 is a top left perspective view of the long life vehicle ventilation system of the present invention.

FIG. 4 is a top right front and partially exploded view of the air pump and adapter of the long life vehicle ventilation system of FIG. 1.

FIG. 5 is a top left view of a rearward facing vent cover often present in association with rear vents present on long life vehicles.

FIG. 7 is a side plan view of a blank used to form the duct in the present invention.

FIG. 8 is a cross-sectional view of a duct formed using the blank in FIG. 8.

FIG. 9 is a plan view of the flashing used to circumscribe and support the duct of FIGS. 7 and 8.

FIG. 10 is shows a plan view of the blank used to form the plenum of the present invention.

FIG. 11 shows a vertical cross-sectional view of the plenum formed by using the blank of FIG. 10.

FIG. 12 is a horizontal cross-sectional view of the plenum formed by the blank of FIG. 10. The cross-section shown in FIG. 13 is generally at a right angle to that shown in FIG. 11.

FIG. 13 is a plan view of a blower adapter blank.

FIG. 14 is a longitudinal cross-sectional view of the blower adapter formed by the blank shown in FIG. 13.

FIG. 15 is a lateral cross-sectional view of the blower adapter formed by using the blank of FIG. 13.

FIG. 16 is a plan view of the handle.

FIG. 17 is a side cross-sectional view of the handle formed by using the blank of FIG. 16.

FIG. 18 is a front side perspective view of the present invention.

FIG. 19 is a rear side perspective view of the present invention.

FIG. 20 is a top plan view of the present invention.

FIG. 21 is a side plan view of the present invention showing the electrical cabling and connections in phantom.

FIG. 22 is a back plan view of the present invention.

FIG. 23 is a side plan view of the present invention.

FIG. 24 is a bottom plan view of the present invention.

FIG. 25 is a front plan view of the present invention.

DESCRIPTION OF THE PREFERRED EMBODIMENT(S)

The detailed description set forth below in connection with the appended drawings is intended as a description of a presently preferred embodiment of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention.

Figure 1:
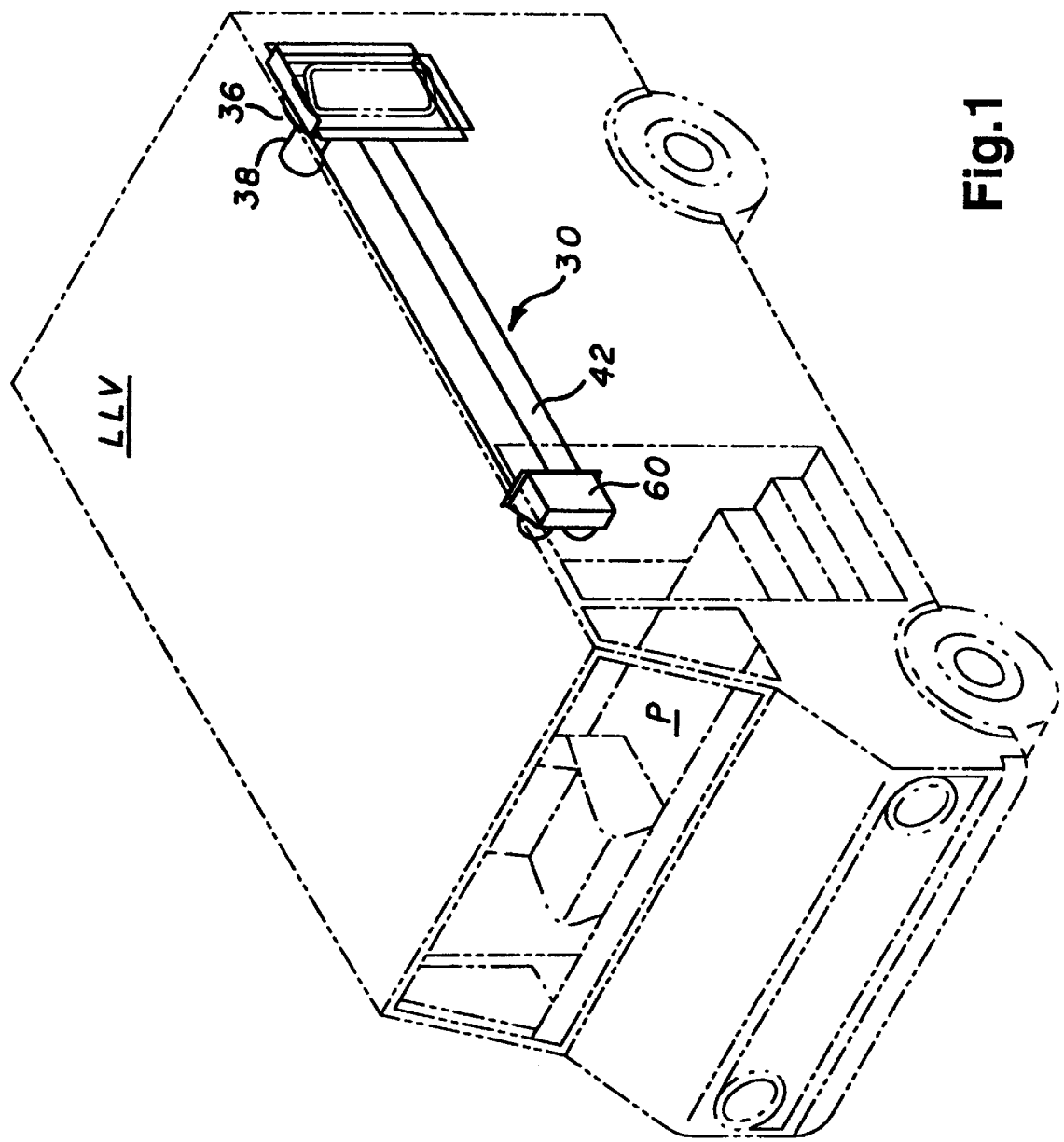
FIG. 1 is a top left and generally perspective view of the long life vehicle ventilation system of the present invention. The long life vehicle (LLV) is shown in phantom.

As shown in FIGS. 1–5, the ventilation system 30 of the present invention capitalizes on the presence of a rear vent 32 present at the upper rear of a long life vehicle (LLV, shown in phantom in FIG. 1). As shown in FIG. 5, the rear vent 32 may have a cover 34. The cover 34 of the rear vent 32 is articulable upon linkage (not shown) so that it may be spaced apart and away from the rear vent 32, allowing air to flow through the gap between the cover 34 and the rear vent 32. It may also be tilted so that it traps air into the vent like a cowling or the like when the cover is disposed in a forward-facing position. As shown in FIG. 5, the rear cover 34 is disposed in a rearwardly-facing position, a position most advantageous for keeping out the elements (especially rain) when the long life vehicle LLV is traveling in a forward direction.

As shown in FIGS. 1–4, and particularly FIG. 2, the vent system 30 of the present invention uses an adapter 36 that fits over the rear vent 32 in the interior of the LLV. The adapter 36 completely encloses the rear vent 32 save for a preferably circular opening (FIGS. 13, 19, and 23) directly over the rear vent 32. The opening 120 is the inlet to a fan or other air pump 38 which in one embodiment may be a squirrel cage fan. The squirrel cage fan 38 has an outlet 40 which is connected to a duct 42. The duct 42 passes through an interior bulkhead 50. The duct 42 is held in place on the bulkhead 50 by aluminum flashing 52 in conjunction with a rubber gasket 54. The bulkhead is cut out, forming an aperture 56 in order to accommodate the duct 42. The flashing 52 and gasket 54 ensure that the duct 42 is secured to the bulkhead 50 without rattling or making other minor collisions with the perimeter of the aperture 56. The gasket 54 may be flexible and resilient. A snug fit of the gasket 54 about the duct 42 allows the gasket through to absorb some of the duct's motion.

A vent assembly 60 receives the air pumped by the squirrel cage fan 38 through the duct 42. The vent assembly 60 is also attached to the bulkhead 50 or otherwise secured at the cut out aperture 56 to receive the air flowing from the duct 42. The vent assembly provides a plenum 62 as a small and temporary reservoir for the air flowing from the duct 42. The air from the plenum 62 flows into the passenger area P via adjustable louvers 64 having adjustable grills 66. The louvers 64 allow for gross redirection of the air flowing from the plenum 62 while the grills 66 provide for finer adjustment thereof.

An electrical cable 70 provides electrical power to the fan 38. The fan 38 generally takes the place of an auxiliary fan generally present as standard equipment in LLV's used by the U.S. Postal Service (USPS). This auxiliary fan may be removed. As shown in FIG. 2, a resistor 80 may be present in the duct 42. This resistor enables the fan 38 to provide two working speed levels in a manner similar to that of the auxiliary fan the vent system 30 of the present invention replaces. Additionally, a diode 82 (FIG. 4) may be present in order to prevent back voltage from being impressed upon the ignition by the fan 38. The free spinning of the fan motor can act as a generator, impressing voltage on the associated wiring.

When installed, the ventilation system 30 provides cool outside air to the passenger compartment P of the LLV. Such cool air flow provides for a more amenable working environment for the driver as it cools the passenger compartment of the LLV, flushing out warmer air and providing a pleasant, cooling draft upon the driver.

The ventilation system 30 does not merely recirculate warm air already present in the passenger compartment P. Nor does it pull outside air through a duct adjacent to the warm engine compartment, thereby warming such air. Instead, the ventilation system of the present invention provides fresh, cool outside air in a manner that preserves the refreshing quality of such air.

In its unique rear-to-front flow system, the present invention provides quantities of fresh, outside air without preheating and without taking in vehicle exhaust.

In so doing, the ventilation system enables greater operator comfort in a cost-efficient manner. With greater operator comfort, better results are achieved as the operator can concentrate better and devote more personal resources to the tasks and responsibilities at hand.

Additionally, the present invention is easily installed by retrofit into existing LLVs. New LLVs can incorporate the present invention during manufacture, increasing the ease with which the present invention can be installed. Furthermore, if the present invention is incorporated during manufacture, an additional vent or vents can be added to the cargo compartment of the LLV to provide additional venting lost by the dedication of one or more cargo compartment vents to the cooling and venting of the passenger compartment P.

Figure 6:
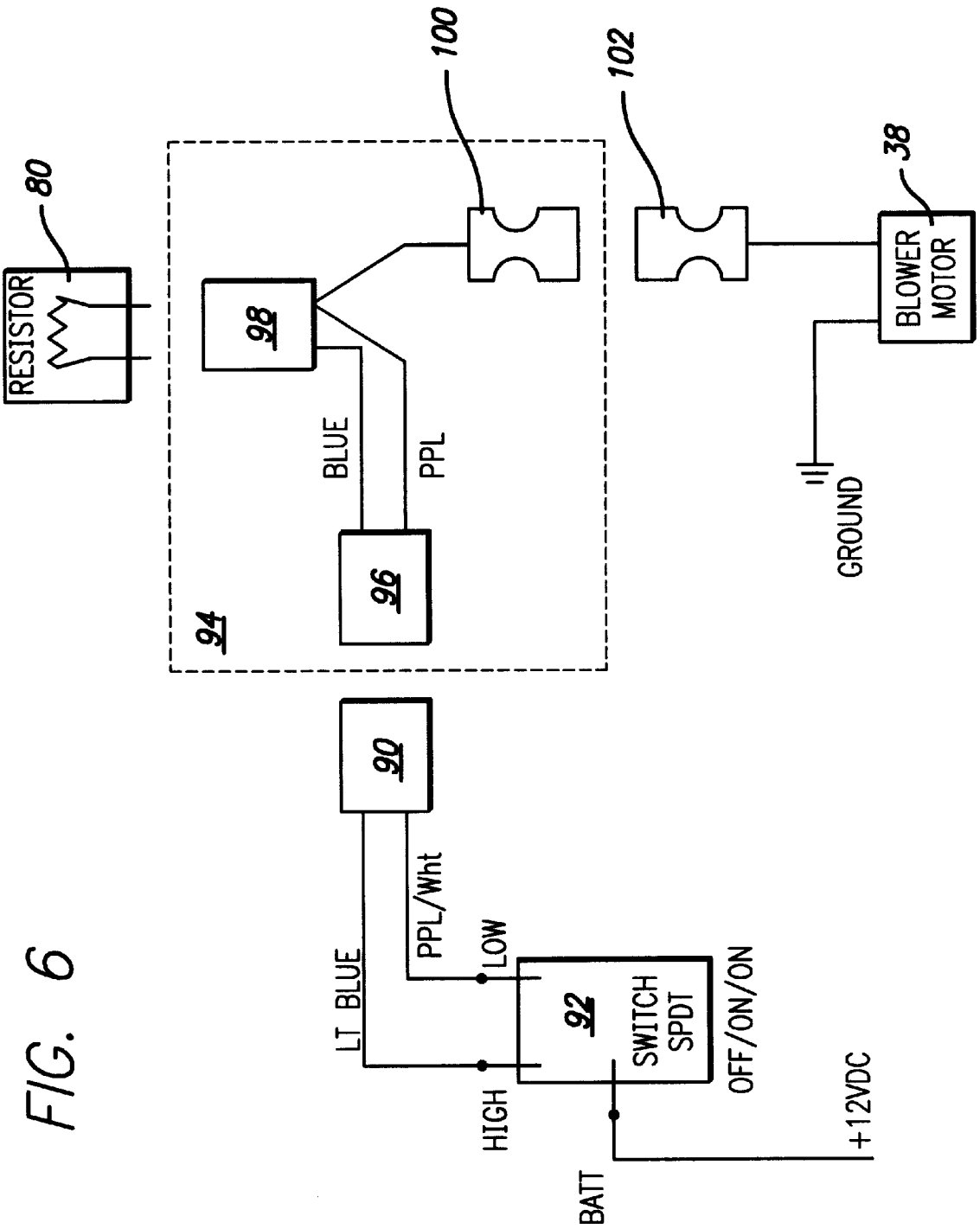
FIG. 6 is a schematic diagram of the electrical circuitry used in conjunction with the long life vehicle ventilation system of the present invention.

Having set forth generally the mechanical construction of the ventilation system 30 of the present invention, FIG. 6 shows one embodiment of the electrical power supply taken from currently existing facilities present in some LLV's, particularly those used by the USPS.

An existing LLV harness 90 (such as that used for the auxiliary fan) is connected to a single-pole double-throw (SPDT) 92 switch. The SPDT switch 92 is connected to the battery and grounded to the chassis (via the blower motor 38) to provide 12 volts DC to the blower motor/fan 38. An Evans harness 94 generally corresponds to the electrical cable 70 shown in FIG. 2. The Evans harness 94 has a mating harness connector 96 that connects to the existing LLV harness connector 90 to establish the requisite electrical connection. The mating harness connector 96 is connected to a resistor connector 98. The resistor connector 98 also is connected to a blower motor connector 100 which connects to a mating blower motor connector 102 that is supplied with the motor or fan 38. The blower motor fan 38 may then be grounded to the chassis in order to complete the circuit with a single pole double throw switch 92. Note should be made that the resistor 80 should be mounted in the air flow or duct 42. Among other things, this may prevent the resistor 80 from establishing a connection with the chassis, and thereby ground, preventing a short circuit to ground from occurring via the electrical cable 70/Evans harness 94.

FIGS. 7–17 show manufacturing layouts and indications for an embodiment of the present invention. FIGS. 7 and 8 show the duct 42 blank in flat (FIG. 7) and formed (FIG. 8) configurations. FIG. 9 shows the flashing 52. The dimensions of the rubber gasket 54 are generally similar to those of the flashing 52 save that the aperture present in the gasket 54 may be smaller to more snugly or tightly fit about the duct 42. FIGS. 10–12 show the flat blank, side cross-sectional, and top cross-sectional views, respectively, of the plenum 62 of the vent assembly 60.

FIGS. 13–15 show the flat blank for the fan adapter 36, a side cross-sectional view thereof, and a top cross-sectional view thereof, respectively.

FIGS. 16 and 17 show the flat blank and side cross-sectional formed views of the handle 110 shown in FIG. 5 on the cover 34 of the rear vent 32. In a manner similar for the other stamped or formed portions of the present invention, the handle 110 may be powder coated in white to protect the metal and provide an aesthetically conforming appearance to the other physical portions of the LLV.

Certain advantages are realized by the ventilation system 30 of the present invention. Included in these are the fact that fresh outside air is vented into the passenger section of the LLV, avoiding recirculation of already hot air by the standard auxiliary fan or by ventilation of the interior by ductwork adjacent the hot engine compartment. As mentioned above, the vent cover 34 allows the ventilation system 30 of the present invention to be used while it is raining even though the LLV is moving forward. The cover 34 prevents rain from entering the rear vent 32 when the rear vent cover is disposed in a rearward-facing position. The rubber gasket 54 serves to isolate the duct 42, suppressing rattle as well as allowing the LLV to flex during travel without damage to the duct 42.

By better ventilating the confines of the passenger compartment P of the LLV, less thermal stress is exerted upon the operating instruments of the LLV, as well as upon the driver. This may lead to greater efficiencies including safer driving, faster deliveries, and general overall alertness and sense of well being as less thermal stress is being placed upon the person responsible for and driving the LLV. Additionally, economic advantages may be realized as the present ventilation system may reduce the need for air conditioning, an expensive addition to vehicles requiring significant installation and maintenance expenses. With the diminished use of air conditioning, fuel efficiency may be increased.

The ventilation system 30 of the present invention is also seen as being an efficient and low cost way to provide better ventilation for the passenger compartment P for the LLV. Construction and installation costs are generally much lower than that for air conditioning and the like. Additionally, the ventilation system 30 of the present invention provides a much better alternative to the present circulatory fan known in the art and presently installed in most LLV's.

The squirrel cage motor 38 may be an original stock motor enhanced with a high performance metal blower wheel. In one embodiment, the motor may be an HV034524 motor and the wheel may be an HV024229 blower wheel as are known in the art. Under such conditions, airflow (SCFM) ranged from 273.0 to 193.0 with the corresponding current (Amps) ranging from 13.0 to 9.8 for water column pressure measurements (inches) ranging, respectively, from 0.0 to 1.5. Other air pumps may be used to good effect. However, compliance with the currently-existing standards and interfaces present in LLV's are seen as providing some convenient, established, and well-tested means by which an advantageous air pump 38 used in the present vent system 30 may be achieved.

FIGS. 7–17 show particular manufacturing aspects of the present invention and the use of sheet metal materials is currently contemplated as having significant advantage.

In FIGS. 7 and 8, the duct 42 is shown. FIG. 7 shows the sheet metal flat 130 used to construct the ultimate duct 42. The flat 130 is generally 50 inches long and approximately 15.90 inches wide. FIG. 7 shows in dashed lines 132 the 90° folds. The forms the folds show in FIG. 8 with its cross-section of the ultimately formed duct 42. As can be seen on the left-hand side of FIG. 7, two holes of approximately 0.187 inches diameter are formed approximately 0.25 inches from the left side 136. The first hole 134 is formed approximately 0.25 inches from the left-hand side 136 of the flat sheet 130 and approximately 1.83 inches above the bottom side 138. The second hole 134 is also formed approximately 0.25 inches from the left-hand side 136 of the flat sheet 130, but is placed approximately 9.53 inches above the bottom 138 of the flat sheet 130. The holes 134 may serve to secure the ultimate duct 42 to the fan outlet 40. A second series of holes is formed in order to hold the resistor 80 as shown in FIG. 2. A central hole 150 is formed a diameter of approximately 1.25 inches. This resistor hole 150 is flanked on either side by two flanking holes 152 that serve to allow securement of the resistor 80.

Additional holes 156 may be formed through it which rivets or other fasteners can be used to attach the sheet metal 130 to itself to form the duct 42. These holes 156 are generally disposed linearly adjacent the top edge 158 of the sheet metal 130. As shown in FIG. 7, and moving from left to right, the holes are approximately 15.70 inches from the bottom edge 138. The first of these holes 156 is placed at approximately 2 inches from the left edge 136 with the second, third, and fourth holes located approximately 17.33 inches, 32.66 inches, and 48.00 inches away from the left side 136, respectively. Each of these holes 156 is approximately 0.130 inches in diameter.

As shown in FIG. 8, in order to form the duct 42, the sheet 130 must be bent at four corners 132 with there being a certain amount of overlap 170 so that the fasteners (not shown) may pass through the fastening holes 156 to attach the top side 158 of the sheet 130 to the bottom side 138.

Once the holes 134, 150, 152, 156 have been formed to the sheet flat 130, the sheet flat 130 is bent at 90° angles in order to form the duct 42. Working from the bottom edge 138 to the top edge 158 of the sheet flat 130, the first side 172 of the duct 42 is formed by bending a corner at approximately 3.61 inches from the bottom edge 138. The next side of the duct 42 is formed by bending a 90° angle approximately 4.23 inches away from the first corner 132. This forms the bottom side 174 of the duct 42. The rear side 176 of the duct 42 may be formed by bending a 90° corner approximately 3.66 inches away from the corner adjacent to the bottom side 174. The top side 178 is formed in the corner 132 approximately 4.28 inches from the corner adjacent to the rear side 176 of the duct 42.

The resistor hole 150 is formed approximately 5.64 inches above the bottom side 138 of the flat sheet 130 and approximately 8.00 inches from the left side 136. The two flanking holes 152 are also formed with their centers approximately 5.64 inches above the bottom side 138. The first flanking hole is formed approximately 7 inches away from the left-hand side 136, while the right flanking hole 152 is formed approximately 8.92 inches away from the left-hand side 136. Each of the two flanking holes 152 may be punched out to form a circular aperture of approximate diameter 0.078 inches. The holes may additionally be enlarged or extruded in order to form flanking holes 152 of approximate diameter 0.130 inches.

As mentioned previously, a small overhang 170 carries the fastener holes 156 in order to attach the sheet metal flat 130 to itself. This overhang 170 is approximately 0.50 inches in length.

In FIG. 9, the flashing 52 is shown with a single centralized square aperture 180 surrounded by the flashing 52. The flashing 52 is approximately 10.90 inches wide and 6 inches tall. As set forth above, the gasket 54 has dimensions similar to that of the flashing 52 save that the gasket 54 may fit more snugly about the duct 42.

As shown in FIG. 9, a series of holes are present in the flashing 52 by which it may be attached to the bulkhead 50, such fastening may also serve to attach the vent assembly 60.

As shown in FIG. 9, the lower left hole 182 is approximately 1.19 inches from the bottom side 184 of the flashing 52 and approximately 0.50 inches from the left side 186 of the flashing 52. The upper left hole 188 is approximately 4.81 inches above the bottom edge 184 and approximately 0.50 inches from the left edge 186.

The lower right hole 190 is approximately 1.19 inches above the bottom edge 184 and approximately 10.40 inches away from the left edge 186. The upper right hole 192 is approximately 4.81 inches above the lower edge 184 and approximately 10.40 inches away from the left edge 186.

The aperture 180 is generally rectangular in shape and generally begins at a lower left corner 196, approximately 0.60 inches above the lower edge 184 and approximately 3.39 inches away from the left edge 186. The opposite corner 198 of the rectangle is at approximately 5.40 inches above the bottom edge 184 and approximately 7.51 inches away from the left edge 186.

FIGS. 10–12 show the plenum 62 of the vent assembly 60. The plenum may be made of 18-gauge aluminum and have an approximate size of (in its flat form, FIG. 10) 22.62 inches by 16.75 inches. In FIG. 10, a number of bends and/or folds are indicated as well as several holes for the affixation of fasteners and the like to secure the plenum 62. If an origin is taken at point 210, as if the plenum flat 212 were formed from a singular rectangular piece of aluminum, the following approximate dimensions may be used to achieve plenum 62 of the present invention.

As noted in FIG. 10, several dashed lines are present, indicating the bending or folding of the metal along the dashed lines to achieve the final plenum form. The plenum flap 212 has five major sections: a central flap 220, a lower flap 222, an upper flap 224, a left flap 226, and a right flap 228. The lower flap 222 has three tabs: a left tab 230, a lower tab 232, and a right tab 234. The lower flap itself begins, as spaced away from the origin 210, approximately 6.86 inches over to the right and approximately 0.47 inches up from the bottom to define the lower left corner 240 of the lower flap 222. The upper right corner 242 of the rectangular lower flap 222 is approximately 15.76 inches over and 6.34 inches up. The rectangular left tab 230 is approximately 6.46 inches over and approximately 0.47 inches up from the origin at its lower left corner 246. The upper right corner 248 of the rectangular left tab 230 is at approximately 6.86 inches over and approximately 6.25 inches up from the origin 210. The right tab 234 is generally a mirror image of the left tab 230 with correspondingly similar dimensions. The lower tab 232 is generally rectangular in shape and has a lower left corner 254 at approximately 6.86 inches over and 0 inches up from the origin 210. The upper right corner 256 of the lower tab 232 is located approximately 15.76 inches over and approximately 0.47 inches up from the origin 210.

The center panel 220 of the plenum flap 212 is generally rectangular and generally has a lower left corner 260 approximately 6.86 inches over and approximately 6.34 inches up from the origin 210. The upper right corner 262 of the central panel 220 is located approximately 15.76 inches over and approximately 10.26 inches up away from the origin 210.

The left and right flaps 226, 228 are generally mirror images of each other and are generally oblong in shape, flaring out and away from the center panel 220. As shown in FIG. 10, the bottom side 270 of the left panel 226 extends straight and outward from the central panel 220. The upper side 272 of flap 226 angles upwardly approximately 10–20° for approximately 5.926 inches. The left flap 226 extends outwardly in a straight manner along the extension edge 274 for approximately 0.97 inches. The lower left corner of left flap 226 is approximately 0 inches away from and approximately 6.34 inches above the origin 210. The lower right corner of the left flap 226 is the same as the lower left corner 260 of the central panel 220. Consequently, the lower right corner 260 of the left flap 226 is located approximately 6.86 inches away from and approximately 6.34 inches above the origin 210. The upper right corner 278 of the left flap 226 is located approximately 6.86 inches away from and approximately 10.26 inches above the origin 210. The upper left corner 280 of the left flap 226 is located approximately 0 inches away from and approximately 11.34 inches above the origin 210. The corner between the upper flap extension 274 and the angled upper side 272 of the left flap 226 is located approximately 0.97 inches away from and approximately 11.34 inches above the origin 210.

As mentioned previously, the right flap 228 is generally a mirror image of the left flap 226.

Both flaps have holes for attachment and otherwise at the following locations. The following locations are given for the left flap 226 with the holes on the right flap 228 generally being mirror images of those on the left flap 226. Two holes of 0.250 inches in diameter are located approximately 0.50 inches away from the origin 210. The lower hole 290 is located approximately 7.03 inches above the origin 210, while the second hole 292 is located approximately 10.65 inches above the origin 210.

A series of four holes approximately 0.130 inches in diameter are located as follows. A lower left hole 300 is located approximately 1.25 inches away from and 6.59 inches above the origin 210. An upper left hole 302 is located approximately 1.25 inches away from and 11.07 inches above the origin 210. An upper right hole 304 is located approximately 5.155 inches away from and approximately 10.31 inches above the origin 210. A lower right hole 306 is located approximately 5.155 inches away from and approximately 6.59 inches above the origin 210.

The upper flap 224 has a lower left corner 310 approximately 6.86 inches away from and approximately 10.26 inches above the origin 210, making it generally coincident with the upper right corner of the left flap 226. The upper right corner 312 of the upper flap 224 is located at approximately 15.76 inches away from and 16.30 inches above the origin 210.

The top flap 224 has three tabs: a left tab 320, an upper tab 322, and a right tab 324. The lower edges of the left and right tab adjacent the left and right flaps, respectively are angled generally at the same angle as the top edges of those flaps, namely at approximately 10 to 20°. The angles made by the lower edges for tabs 320, 324 generally make them parallel to the angled top edges of the left and right flaps 226, 228. The upper edges of the tabs 320, 324 are generally straight.

The lower left corner 330 of the left tab 320 is located approximately 6.46 inches away from and approximately 10.65 inches above the origin 210. The upper right corner 332 of left tab 320 is located at approximately 6.86 inches away from and approximately 16.30 inches above the origin 210. The right tab 324 is generally a mirror image of the left tab 320. The top tab 322 has its lower left corner at the same point as the upper right corner 332 of the left tab 320. The lower left corner 332 of the upper tab 322 is located at approximately 6.86 inches away from and 16.30 inches above the origin 210. The upper right corner 334 of the upper tab 322 is located approximately 15.76 inches away from and 16.75 inches above the origin 210.

Two large holes of approximately 3.94 inches in diameter are symmetrically located along a line bisecting the top flap 224 so that one hole 340 is located adjacent the left tab 320 and the other hole 342 is located adjacent the right tab 324. The centers of each hole are approximately 12.41 inches above the origin 210 with the left hole 340 being approximately 9.16 inches away from the origin 210 and the right hole 342 being approximately 13.46 inches away from the origin 210. As shown in FIG. 11, upon bending the plenum flat 212 along the dashed lines, a side cross-sectional view of the formed plenum 62 has an upwardly extending tab 350 of approximately 0.50 inches followed by a lower panel 352 approximately 6 inches in length. The tab 350 and lower panel 352 are bent at right angles to one another as is back panel 354 with respect to the lower panel 352. The back panel is approximately 4 inches in height and is bent at an angle of approximately 105° with respect to the top panel 356. The top panel 356 extends approximately 6.13 inches and ends in a vertical top tab 358 bent at approximately the same angle as that shared between the top 356 and back 354 panels, namely approximately 105°.

The opening 360 formed between the bottom panel 352 and the top corner of the top panel 356 is approximately 5 inches in height. The upper tab 358 is approximately 0.050 inches in height.

As shown in FIG. 12, a generally-downward cross-sectional view shows the formed plenum 62 as generally a box-like structure with the front opening 360 extending approximately 9 inches in width. The extending portions of the left and right flaps 226, 228 of FIG. 10 extend out approximately 1 inch from either side of the associated left and right flaps 226, 228. The formed plenum 62 is approximately 6 inches deep. The left and right tabs 230, 234 are shown in FIG. 12 as projecting into the interior of the plenum 62 when folded along the dashed line shown in FIG. 10.

FIG. 13 shows the sheet metal flat 370 for the adapter 36. If an origin is established from an imaginary rectangle containing the entire adapter flat 370 at its lowest left corner. The main rectangular portion 376 is defined by a corner at approximately 1.86 inches away from and approximately 1.86 inches above the origin 372. The upper right corner 378 is located on the main rectangular portion 376 of the adapter flat 370 at approximately 11.76 inches away from and 19.26 inches above the origin 372.

The adapter flat 370 may be made of 18-gauge aluminum and have a general size of approximately 21.21 inches× 13.62 inches from which the ultimate adapter flat 370 may be cut.

The inner opening 120 through which the air pump 38 controls air from the rear vent 32 is centered upon a point approximately 8.31 inches away from and 11.30 inches above the origin 372. The inner opening 120 may be approximately 4 inches in diameter and flanked at 4 corners of a circumscribing square with attachment holes or the like 380. The lower left corner of that square, at which the attachment holes 380 are formed at its corners, may be located at approximately 5.84 inches away from and 8.83 inches above the origin 372. The upper right corner of the circumscribing square may be located at approximately 10.78 inches away from and approximately 13.77 inches above the origin 372.

A series of flaps or tabs circumscribe the main rectangular portion 376 of the adapter flat 370. The left flap 390 is generally a mirror image of the right flap 392 and the top flap 394 is generally a mirror image of the bottom flap 396. However, the bottom flap 396 is generally folded an additional time in order to provide the outwardly-extending tab 400 as shown in FIG. 14. Additionally, the bottom flap 396 has a series of three holes 402 spaced respectively, approximately 2.81 inches, 6.81 inches, and 10.81 inches from the origin 372. Each of the holes 402 is approximately 0.38 inches above the origin 372. The lower left corner 410 is located approximately 1.86 inches away from and approximately 0 inches above the origin 372. The upper right corner 412 of the lower tab 396 is located approximately 11.76 inches away from and approximately 1.86 inches above the origin 372. The lower left corner 414 of the left tab 390 is located approximately 0 inches away from and 1.86 inches above the origin 372. The upper right corner 416 of the left flap 390 is located approximately 1.86 inches away and 19.26 inches above the origin 372.

The lower left corner of the top flap 394 is generally the same as the upper right corner 414 of the left tab 390, as these points may be shared between the two flaps. The upper right corner 418 of the top tab 394 is located approximately 11.76 inches away from and approximately 21.21 inches above the origin 372. The lower left corner 412 of the right tab 392 is the same of the upper right corner 412 of the bottom tab 396 and is located approximately 11.76 inches away from and approximately 1.86 inches above the origin 372. The upper right corner 420 is located at approximately 13.62 inches away from and 19.26 inches above the origin 372.

The top 394 and bottom 396 tabs also have extending projections 430 that are generally square in nature and project from the left and right sides of the top and bottom tabs 394 adjacent the left and right tabs 390, 392. There is a slot of approximately 0.093 inches separating the extending projections 430 from the left and right tabs 390, 392. The extending tabs are generally square in nature and project approximately 0.45 inches out and away from opposite sides of the top and bottom tabs 394, 396 adjacent the left and right tabs 390, 392.

The left tab 390 has a series of three vertically aligned holes approximately 0.38 inches away from the origin 372. These holes 436 are spaced apart and are located above the origin 372 at approximately 2.81, inches 10.56, inches and 18.30 inches The holes are approximately 0.187 inches in diameter and have their mirror image located in correspondingly similar places on the right tab 392. Additionally, four additional holes are present on the left tab 390, each of these holes 438 occurring in pairs at the top and bottom of the left flap. These holes are located as follows: at approximately 0.91 inches away from and approximately 2.16 inches above the origin 372; at approximately 1.65 inches away from and approximately 2.61 inches above the origin 372; at approximately 0.91 inches away from and 18.96 inches above the origin 372; and at approximately 1.65 inches away from and approximately 18.96 inches above the origin 372. Mirror images of these holes present on the left flap 390 are present on the right flap 392.

Additionally, on the right flap 392, a hole 440 is present for the diode 80. This hole is approximately 0.25 inches in diameter and located at approximately 12.32 inches away from and 6.83 inches above the origin 372.

As shown in FIG. 14, the top flap 394 is bent in an angle of approximately 90 degrees with respect to the main rectangular portion 376 of the adaptor flat 370. The main rectangular portion 376 of the adaptor 36 extends approximately 17.50 inches in length vertically. An extra fold 450 is present on the bottom flap 396 providing an inwardly extending tab 452 of approximately 1.25 inches and a downwardly extending tab 400 of approximately 0.75 inches. FIG. 15 shows a vertical cross section of the formed adaptor 36 with the left and right tabs 390, 392 folded to form extending projections 460 of approximately 1.25 inches in length and outwardly extending portions 462 of approximately 0.75 inches in length. The width of the main rectangular portion 376 of the adaptor flap 370 is approximately 10.00 inches in width.

In FIGS. 16 and 17, a handle 110 is shown in its flat (FIG. 16) and bent (FIG. 17) forms. The handle may be made of 18 gauge stainless steel and is approximately 1.50 inches tall and 1.00 inches wide. The handle may be formed from a rectangular piece of metal with the corners rounded off at a diameter of approximately 0.25 inches If an origin is taken at the lower right hand corner 470 of the minimum rectangle incorporating the handle 110, two holes are present approximately 0.25 inches away from the origin. The holes 472 may be approximately 0.130 inches in diameter with the lower hole 472 being approximately 0.25 inches above the origin and the upper hole being approximately 1.25 inches above the origin. As shown in FIG. 17, the first portion of the handle 110 having the holes is bent at an angle with respect to the remaining portion of the handle, such angle being approximately 105°. The first portion 474 of the handle 110 may be approximately 0.50 inches in length and the remaining portion 476 may be approximately 0.63 inches in length.

In order to install the Long Life Vehicle Ventilation System of the present invention, the ventilation system is preferably installed on the upper left side of the vehicle. In order to ensure that no shocks or current arise from the installation of the present invention, the ignition should be in the off position and one or more of the leads on the battery disconnected from it.

All the parts should be removed from any box that the parts are shipped or carried in and the installer should become familiar with each part and assembly step. The rear vent 32 should be inspected to ensure that it easily opens and closes. This may entail lubricating the linkage associated with the rear vent 32. The handle 110 should be installed with the holes 472 and the outside of the vent cover 34. The blower assembly (adaptor 36 and air pump 38) are placed directly over the existing vent with the assembly allowed to rest on the upper edge of the inside wall. The left edge of the blower is lined up with the rear seam on the inside wall panel so that the flange on the blower assembly is directly over the vertical roll of rivets on the rear seam of the vehicle. The blower assembly is secured with ⅝ inches number 8 tek screws which are self-drilling/tapping. Alternatively, the blower assembly may be secured with pop rivets. The ground wire, which is black in color, is attached to the diode 80 on the lower right side of the blower to complete the ground.

A template included with the present invention may be placed over the left side of the bulkhead in order to provide an indication of what portion of the bulkhead needs to be cut out in order to provide for aperture 56. The template rests over the top edge of the bulkhead and against the left wall so that four holes may be marked for drilling. Upon removing the template, small quarter inch holes are drilled in each corner of the rectangular cut out to allow a saw blade to penetrate the bulkhead. Additional quarter inch holes are drilled where the round holes were marked using a jig saw, drill, or equivalent. The cut out is completed and the holes and cut out are entirely deburred.

The duct is installed with the flashing 52 and gasket 54 used to secure the duct 42 between the blower assembly, particularly the air pump 38, and the bulkhead 50. The duct 42 is attached to the fan outlet 40 and secured to the bulkhead 50 by means of the flashing 52 and its attachment to the bulkhead 50 compressing the gasket 54 therebetween.

From inside the cab or passenger compartment P, the plenum is installed by placing it over the duct as it enters the cab through the bulkhead 50. Four mounting screws are used to secure the plenum to the bulkhead, possibly in conjunction with the securement of the flashing 52 and the gasket 54 to the bulkhead 50.

With respect to the wire harness, the female plug 98 is connected to the resistor 80 on top of the duct 42 near the air pump 38. The blower power supply wire is connected to the blower and the wire harness 70 may be routed over the top of a cargo area light and over the bulkhead 50 across the top of the left side door and then down between the windshield and the side window. The wire harness 70 then fits between the dashboard and the side of the truck/LLV at the front. The wire harness should be routed behind the heater/blower of the LLV and plugged into the connector supplying power to the auxiliary fan. If not previously performed, the auxiliary fan should be removed. The wire harness 70 can then be secured with wraps and self-adhesive holders.

In many LLVs, the auxiliary fuse fan is rated at 10 amps and should now be replaced with a 15 amp fuse. All debris is then removed from the installation area and the leads reconnected to the battery. The unit is then tested with the rear outer vent opened towards the rear of the vehicle and inside vents adjusted. The installation is now complete and the Long Life Vehicle Ventilation System 30 of the present invention is installed and may be used in conjunction with the LLV.

In a preferred embodiment, the following parts, components, and tools may be used to achieve the present invention:

Blower Assembly Part #88800701

1-Blower
1-Adaptor
1-½" × 45" Foam Seal
Duct Assembly Part #88800702

1-Duct
1-Resistor
2-8-32 × ⅜ Self-Tapping PPH type 23
1-Flashing Part #88800703
1-Gasket Part #Vent04
Adjustable Vent Assembly Part #88800704

1-Plenum
2-Housing (Plastic)
2-Grill (Plastic)
1-½" Foam Seal
Hardware Kit #88800705

10-#8 × 1/12" Tek Screw (Plastic)
4-10-32 × 1 PPHMS
8-#10 Flat Washer 9 (Plated)
4-Nylon Nut (Plated)
5-Cable Tie Holder
7-⅛ × 4.00 Cable Tie
1-15 Amp Fuse
2-⅛ × ¼ Pop Rivet
Tools Required Drill Motor
Jig Saw, Die Grinder or Equivalent
¼" ⅜" Drill Bits
¼" Socket Driver
Philips Screwdriver
⅜" Wrench
Pop Rivet Gun While the present invention has been described with regards to particular embodiments, it is recognized that additional variations of the present invention may be devised without departing from the inventive concept.

What is claimed is:

1. A ventilation system for a long life vehicle, comprising:
   a side panel defining a rear vent, said rear vent permitting exterior air to flow through said side panel of the long life vehicle;
   an air pump, said air pump coupled to said rear vent and pumping air away from said rear vent;
   a duct, said duct in communication with said air pump to conduct pumped air away from said air pump; and
   a forward ventilation outlet, said forward ventilation outlet in communication with said duct; whereby
   air ambient said rear vent may be transmitted to said forward ventilation outlet by said air pump in order to increase air circulation adjacent said forward ventilation outlet, said air ambient said rear vent being generally cooler and fresher than other air generally ambient said forward ventilation outlet.

2. The ventilation system for a long life vehicle or the like of claim 1, wherein said rear vent further comprises:
   an articulating cover, said articulating cover selectively taking air from a direction rearward of said rear vent; whereby
   said articulating cover prevents rain from entering said rear vent while continuing to allow ventilation through said rear vent.

3. The ventilation system for a long life vehicle or the like of claim 2, wherein said rear vent further comprises:
   said rear vent being at an upper rear corner of the long life vehicle on a side opposite that of an exhaust of the long life vehicle.

4. The ventilation system for a long life vehicle or the like of claim 1, wherein said air pump further comprises:
   a fan.

5. The ventilation system for a long life vehicle or the like of claim 4, wherein said fan further comprises:
   a squirrel-cage fan.

6. The ventilation system for a long life vehicle or the like of claim 5, wherein said squirrel-cage fan further comprises:
   a one-speed squirrel cage fan, a speed of said one-speed squirrel cage fan controlled by voltage such that a lower voltage reduces said speed of said fan and a higher voltage increases said speed of said fan.

7. The ventilation system for a long life vehicle or the like of claim 1, wherein said duct further comprises:
   a rectangular tube, said rectangular tube connected at a first end to an outlet of said air pump and at a second end to said ventilation outlet, said rectangular tube directly transmitting air from said air pump to said ventilation outlet without interruption.

8. The ventilation system for a long life vehicle or the like of claim 7, wherein said rectangular further comprises:
   a straight rectangular tube.

9. The ventilation system for a long life vehicle or the like of claim 1, wherein said ventilation outlet further comprises:
   a plenum, said plenum receiving air from said duct; whereby
   air from said duct may temporarily collect before flowing onward and out of said ventilation outlet.

10. The ventilation system for a long life vehicle or the like of claim 1, wherein said ventilation outlet further comprises:
    a vent.

11. The ventilation system for a long life vehicle or the like of claim 10, wherein said vent further comprises:
    at least one louver, said louver allowing gross redirection of air flow exiting said ventilation outlet.

12. The ventilation system for a long life vehicle or the like of claim 11, wherein said louver further comprises:
    a grill, said grill allowing finer redirection of air flow exiting said ventilation outlet.

13. A long life vehicle having a ventilation system for transmitting cool air to a passenger compartment adjacent a hot engine compartment, comprising:
    a rear vent, said rear vent permitting exterior air to flow through a side panel of the long life vehicle, said rear vent being at an upper rear corner of the long life vehicle on a side opposite that of an exhaust of the long life vehicle;
    a cover, said cover adjacent said rear vent and articulating with respect to said rear vent, said articulating cover selectively taking air from a direction rearward of said rear vent so that said articulating cover prevents rain from entering said rear vent while continuing to allow ventilation through said rear vent;
    a squirrel cage fan, said fan coupled to said rear vent and pumping air away from said rear vent, a speed of said fan controlled by voltage such that a lower voltage reduces said speed of said fan and a higher voltage increases said speed of said fan;
    a duct, said duct in communication with said air pump to conduct pumped air away from said air pump; and
    a ventilation outlet, said ventilation outlet in communication with said duct and having a plenum and a vent; whereby
    air ambient said rear vent may be transmitted to said ventilation outlet by said air pump in order to increase air circulation adjacent said ventilation outlet, said air ambient said rear vent being generally cooler and fresher than air ambient an engine of the long life vehicle.

14. A method for ventilating a long life vehicle or the like, the steps comprising:
    providing a rear vent, said rear vent in fluid communication with air ambient an exterior of the long life vehicle;
    providing a forward vent, said forward vent adjacent or within a passenger compartment of the long life vehicle;
    pumping air from said rear vent to provide pumped air internal to the long life vehicle;
    transmitting said pumped air to said forward vent; and
    ventilating said passenger compartment with said pumped air from said rear vent; whereby
    cooler air ambient said rear vent may be transmitted to said forward vent by pumping rear vent air in order to increase air circulation adjacent said forward vent, said air ambient said rear vent being generally cooler and fresher than air ambient an engine compartment adjacent said passenger compartment of the long life vehicle.

15. The method for ventilating a long life vehicle of claim 14, wherein the step of providing a rear vent further comprises:
    providing an articulating cover for said rear vent, said articulating cover selectively taking air from a direction rearward of said rear vent; whereby
    said articulating cover prevents rain from entering said rear vent while continuing to allow ventilation through said rear vent.

16. The method for ventilating a long life vehicle of claim 15, wherein the step of providing a rear vent further comprises:
    said rear vent being at an upper rear corner of the long life vehicle on a side opposite that of an exhaust of the long life vehicle.

17. The method for ventilating a long life vehicle of claim 14, wherein the step of providing a forward vent further comprises:
    providing a plenum for temporarily pooling or collecting air, said plenum receiving air transmitted from said rear vent.

18. The method for ventilating a long life vehicle of claim 17, wherein the step of providing a forward vent further comprises:
    said plenum having at least one louver, said louver allowing gross redirection of air flow exiting said ventilation outlet, said louver having a grill, said grill allowing finer redirection of air flow exiting said ventilation outlet.

19. The method for ventilating a long life vehicle of claim 14, wherein the step of pumping air from said rear vent further comprises:
    pumping said air by means of a squirrel cage fan, said squirrel cage fan having one speed and being controlled by voltage such that a lower voltage reduces said speed of said fan and a higher voltage increases said speed of said fan.

20. The method for ventilating a long life vehicle of claim 14, wherein the step of transmitting said pumped air to said forward vent further comprises:

transmitting said pumped air by a duct, said duct in the form of a straight rectangular tube.

21. A ventilation system for a long life vehicle or the like, comprising:

vent means for permitting air flow through a side panel of the long life vehicle;

air movement means for moving air away from said vent means, said air movement means coupled to said vent means;

duct means for conducting air away from said air movement means, said duct means in communication with said air movement means; and exhaust means for discharging air from said duct means, said exhaust means coupled to said duct means; whereby air ambient said vent means may be transmitted to said exhaust means to increase air circulation adjacent said exhaust means, said air ambient said vent means being generally cooler and fresher than other air generally ambient said exhaust means.

\* \* \* \* \*